US012560242B2

(12) United States Patent
Schuck

(10) Patent No.: US 12,560,242 B2
(45) Date of Patent: Feb. 24, 2026

(54) NON-RETURN VALVE FOR A FLOW CHANNEL THROUGH WHICH A FLOW OF AIR FLOWS

(71) Applicant: Skoberne GmbH, Pfungstadt (DE)

(72) Inventor: Thomas Schuck, Pfungstadt (DE)

(73) Assignee: Skoberne GmbH, Pfungstadt (DE)

( * ) Notice: Subject to any disclaimer, the term of this patent is extended or adjusted under 35 U.S.C. 154(b) by 0 days.

(21) Appl. No.: 18/580,903

(22) PCT Filed: Jul. 21, 2022

(86) PCT No.: PCT/EP2022/070503

§ 371 (c)(1),
(2) Date: Jan. 19, 2024

(87) PCT Pub. No.: WO2023/001970

PCT Pub. Date: Jan. 26, 2023

(65) Prior Publication Data

US 2024/0376986 A1      Nov. 14, 2024

(30) Foreign Application Priority Data

Jul. 21, 2021     (DE) ..................... 10 2021 118 897.0

(51) Int. Cl.
F16K 1/20 (2006.01)
F16K 15/03 (2006.01)

(52) U.S. Cl.
CPC ................ F16K 1/20 (2013.01); F16K 15/03 (2013.01)

(58) Field of Classification Search
CPC .......... F16K 1/20; F16K 15/03; F16K 15/034; F23L 11/005; F23L 13/02; F23M 9/006;
(Continued)

(56) References Cited

U.S. PATENT DOCUMENTS 2,864,394 A * 12/1958 Hempel .................. F16K 15/16
137/527
4,095,615 A * 6/1978 Ramsauer ............. F16K 15/033
137/151
(Continued)

FOREIGN PATENT DOCUMENTS

AT            508208 B      7/2011
DE        3806325 A1      9/1989
(Continued)

*Primary Examiner* — Craig M Schneider
*Assistant Examiner* — Andrew J Rost
(74) *Attorney, Agent, or Firm* — Smartpat PLC

(57) ABSTRACT

A non-return valve for a flow channel has a housing and an outflow opening that can be closed by a pivoting blocking flap. The blocking flap has a dome-shaped bulge. An opening edge of the outflow opening has a hinge region for the blocking flap that transitions into a blocking flap stop region circumferentially opposite the hinge region. The blocking flap stop region is offset so that the opening edge has a progression that is curved in the circumferential direction and in the outflow direction. The housing has an indentation in the circumferential direction, which is not closed by the blocking flap such that the indentation forms a condensate chamber when the housing is inserted into the surrounding flow channel. The indentation is equipped with a flow opening, through which a condensate accumulating in the condensate chamber delimited by the indentation can flow in the interior of the housing.

15 Claims, 11 Drawing Sheets

(58) Field of Classification Search
CPC ............. F23J 2213/204; F23J 2213/302; F23J
2213/70; F23J 13/00; F23J 2900/13004;
F23J 2900/13005
USPC ...................... 137/171, 173, 197, 527–527.8
See application file for complete search history.

(56) References Cited

U.S. PATENT DOCUMENTS

| | | | | | | |
|---|---|---|---|---|---|---|
| 4,178,638 | A | * | 12/1979 | Meyer | ................. | A61M 60/857 |
| | | | | | | 137/527 |
| 5,044,396 | A | * | 9/1991 | Daudet | ................... | F16K 15/03 |
| | | | | | | 137/527.6 |
| 5,601,117 | A | * | 2/1997 | Lewis | .................... | B60H 1/249 |
| | | | | | | 454/162 |
| 5,904,618 | A | * | 5/1999 | Lewis | .................... | B60H 1/249 |
| | | | | | | 454/162 |
| 6,823,905 | B1 | * | 11/2004 | Smith | ................... | F16K 15/031 |
| | | | | | | 141/114 |
| 6,868,806 | B1 | * | 3/2005 | Schimmeyer | ......... | F23L 11/005 |
| | | | | | | 122/135.1 |
| 7,798,235 | B2 | * | 9/2010 | Mondelli | .............. | F16K 15/033 |
| | | | | | | 137/527 |
| 8,636,026 | B2 | * | 1/2014 | Kelly | .................... | F16K 15/031 |
| | | | | | | 137/527 |
| 2005/0092372 | A1 | * | 5/2005 | Wade | ...................... | F16K 15/03 |
| | | | | | | 137/527.6 |
| 2009/0235916 | A1 | * | 9/2009 | Rossetti | ................. | F23L 13/02 |
| | | | | | | 454/6 |

FOREIGN PATENT DOCUMENTS

| | | | |
|---|---|---|---|
| DE | 19606403 | B4 | 11/2006 |
| EP | 1544544 | A1 | 6/2005 |

* cited by examiner

FIG 7

NON-RETURN VALVE FOR A FLOW CHANNEL THROUGH WHICH A FLOW OF AIR FLOWS

CROSS-REFERENCE TO RELATED APPLICATION

This application is a national stage application, filed under 35 U.S.C. § 371, of International Patent Application PCT/EP2022/070503, filed on Jul. 21, 2022, which claims the benefit of German Patent Application DE 10 2021 118 897.0, filed on Jul. 21, 2021.

BACKGROUND

The disclosure relates to a non-return valve for a flow channel through which a flow of air flow having a housing through which air flows in an outflow direction, which non-return valve has an outflow opening that can be closed by a blocking flap pivotably mounted on the housing, wherein the housing is sleeve-shaped and has an inflow opening opposite the outflow opening, wherein the housing can be arranged in a hollow cylindrical flow channel with a sealing flange extending in the circumferential direction around an outer wall of the housing such that an air flow passing through the flow channel flows into the housing in the outflow direction through the inflow opening and out of the housing through the outflow opening, wherein the blocking flap rests against an opening edge in a blocking position, closing the outflow opening, and prevents undesired return flow against the outflow direction into the outflow opening and wherein the blocking flap is pivoted away from the opening edge in an opening position and releases the outflow opening for an air flow passing through the housing in the outflow direction.

It is known from practice that such a non-return valve can be arranged in a flow channel through which an air flow passes in order to allow the air flow passing through the flow channel in the intended direction of outflow to pass through the non-return valve with as little impairment as possible, but to close off the flow channel for a counter-air flow flowing against the outflow direction through the flow channel and thereby prevent a counter-air flow flowing against the outflow direction through the flow channel from passing through the non-return valve into a region of the flow channel located behind the non-return valve.

Such non-return valves can be used, for example, in exhaust gas systems and arranged or used in an exhaust gas channel through which an exhaust gas flow passes.

The exhaust gases generated and emitted by a heating system can flow through an exhaust gas channel in the specified outflow direction and pass the non-return valves arranged in the exhaust gas channel, wherein the exhaust gases flow in the outflow direction through the exhaust gas channel and through the housing of the non-return valve arranged therein and pivot the blocking flap into an opening position. However, undesired return flow of the exhaust gases through this exhaust gas channel in the direction of the heating system is prevented by the non-return valve, as the blocking flap automatically shifts from an opening position to its blocking position and closes the outflow opening as soon as air no longer flows through the housing in the outflow direction. If a counter-air flow flowing back against the outflow direction through the exhaust gas channel reaches the non-return valve, the blocking flap is additionally pressed against the opening edge of the outflow opening in its blocking position by the counter-air flow flowing against the outflow direction and thus reliably closes the outflow opening.

Various designs of such non-return valves are known in practice. The different shapes of the housing and the blocking flap as well as the different bearing mechanisms of the displaceable blocking flap are used in an attempt to minimise the influence on and obstruction of an air flow flowing through the non-return valve in the desired outflow direction, and at the same time to reliably block an air flow flowing against the outflow direction at the outflow opening of the non-return valve and to close off the flow channel.

SUMMARY

The present disclosure provides a design a non-return valve of the type mentioned at the outset that has been improved in such a way that an air flow flowing through the non-return valve in the outflow direction can flow through the non-return valve as unhindered as possible, while a counter-air flow in the opposite direction is reliably prevented or prevented from flowing through the non-return valve against the outflow direction.

This is achieved in that an opening edge of the outflow opening of the housing has a hinge region in which the blocking flap is pivotally mounted on the housing and that transitions into a blocking flap stop region arranged opposite the hinge region in the circumferential direction, said blocking flap stop region being offset in the outflow direction. Most non-return valves are configured to be installed in vertically orientated line sections in which an air flow can either flow vertically upwards or vertically downwards. Since the opening edge of a non-return valve arranged in this way is not aligned horizontally, but the blocking flap stop region is offset in the outflow direction, the blocking flap is not arranged horizontally in a vertically aligned line section such that no drops of liquid can accumulate on the blocking flap, which could impair a displacement of the blocking flap and an unblocking of the outflow opening. In addition, the blocking flap, which is not aligned horizontally but at an angle of at least a few degrees thereto, allows a proportion of the force component of the weight force of the blocking flap directed in the direction of flow to be predetermined and the closing effect caused by this force component and pressing the blocking flap against the opening edge of the housing to be predetermined largely independently of the dead weight of the blocking flap by the offset of the blocking flap stop area relative to the hinge area predetermined in the direction of flow. With the closing effect, the blocking flap is pressed against the opening edge of the outflow opening when there is no air flow and thus closes the outflow opening so that no unwanted counter-air flow can pass through a blocking flap that is not completely closed against the outflow direction of the non-return valve. For blocking flaps with a high unladen weight, for example, the offset of the blocking flap stop region can be specified to be greater than for blocking flaps with a low unladen weight in order to achieve a comparably high contact pressure of the blocking flap on the opening edge in both cases. This contact pressure can thus be set easily and without additional resetting devices or spring devices depending on the blocking flap used.

A particularly advantageous embodiment is provided in that the blocking flap is made from an elastic plastic material and is configured and mounted on the housing in such a way that the outflow opening is closed by the elastically pretensioned blocking flap without air flowing through it. A blocking flap made of an elastic plastic material can be made in one piece and is particularly cost-effective. For example, a blocking flap can be made from a blank of plastic film or plastic sheet. Fluoroelastomers such as Viton® in particular are considered to be particularly suitable elastic plastic materials due to their high temperature resistance and chemical resistance.

The blocking flap made of an elastic plastic material is expediently arranged opposite a force-free blocking flap in such a way that the blocking flap in contact with the opening edge is elastically deformed and the restoring forces generated by this press the elastically deformed blocking flap against the opening edge. In this way, in the case of a blocking flap with a particularly low unladen weight, a contact pressure on the opening edge of the discharge opening can be generated and predetermined by the elasticity and shape of the blocking flap.

Preferably, it is provided that the blocking flap has a fixing section for fixing the blocking flap on or to the hinge region of the opening edge and a pivoting flap section, which is connected to the fixing section via an integral hinge. The formation of an integral hinge enables the blocking flap to be moulded and made in one piece. The fixing section can be used to fix and secure the blocking flap to the housing. For example, a form-fit or latching fixing of the fixing section to the hinge region of the housing can be specified. It is also conceivable that the fixing section is bonded to the hinge region of the opening edge or bonded to the material, for example by welding using a standard friction welding process or ultrasonic welding process. A complex mounting of the blocking flap on a pivoting shaft or the use of additional spring devices to generate sufficient contact pressure is not necessary.

The hinge region of the opening edge can have a contact surface aligned perpendicular to the outflow direction for the fixing section of the blocking flap fixed thereto, while the blocking flap stop region is arranged offset thereto in the outflow direction and thus forces a deformation in a blocking flap made of elastic plastic material with a flat surface, the restoring forces of which press the pivoting flap section aligned at an angle greater than 0° to the contact surface and the fixing section against the opening edge.

Thus, in one embodiment it is provided that a support web is arranged in front of the blocking flap in the outflow direction, on which the non-pivoted blocking flap rests, and which extends transversely over the outflow opening and thus prevents undesired pivoting or deformation of the elastic blocking flap against the outflow direction when the return flow is directed against the outflow opening. In the event of a strong, unwanted return flow against the outflow direction, a blocking flap made of an elastic plastic material could be deformed and pressed into the housing against outflow direction. The support web prevents such undesirable deformation against the direction of flow. The more elastic the plastic material of the blocking flap is, the wider or longer the support web can be. It can also be provided that two or more thin support webs connect spaced-apart regions of the opening edge and extend across the outflow opening in order to be able to provide a plurality of support surfaces for the elastically deformable blocking flap within the outflow opening.

According to one embodiment that is considered particularly advantageous, it is provided that the blocking flap has a dome-shaped bulge with an inner region that is bulging in the outflow direction. The dome-shaped bulge prevents liquid from collecting on the outside of the blocking flap, which could hinder the pivoting movement of the blocking flap in the outflow direction, even if the blocking flap is only slightly inclined.

Expediently, it is optionally provided that the opening edge has a curved course not only in the circumferential direction, but also in the outflow direction.

Due to the design of the blocking flap with a dome-shaped bulge and with an inner region bulging in the outflow direction, the blocking flap, which is pivotably mounted on the housing, can be pivoted into an opening position in which the blocking flap can lie closely against an inner wall of the surrounding flow channel and protrude only slightly into a flow cross-section limited by an inner side of the sleeve-shaped housing.

The opening edge and, accordingly, a circumferential edge of the blocking flap adapted thereto in its course expediently transitions continuously from the hinge region into the blocking flap stop region opposite in the circumferential direction and offset in the outflow direction. Since the opening edge does not run perpendicular to the outflow direction, but instead transitions from a hinge region into the blocking flap stop region arranged opposite in the circumferential direction and offset in the outflow direction, the circumferential edge of the blocking flap does not run perpendicular to the outflow direction or perpendicular to a centre axis of the sleeve-shaped housing. Accordingly, in its blocking position, the blocking flap is not mounted perpendicular to the direction of flow, but is mounted at an angle oblique to the direction of flow against the opening edge, which is predetermined by the offset between the blocking flap stop region and the hinge region in the direction of flow. The blocking flap, which is mounted in the blocking position at an angle to the outflow direction, is already lifted from the opening edge of the sleeve-shaped housing by a slight pressure difference generated by an air flow passing through the housing in the outflow direction and releases the outflow opening for the air flow passing through. The unladen weight of the blocking flap causes the blocking flap to move from the open position to the closed position as soon as there is no sufficient pressure difference or no air flow in the outflow direction through the housing of the non-return valve.

Such a non-return valve is suitable in particular for installation in a vertical section of an exhaust gas channel. The cross-sectional area of the sleeve-shaped housing is expediently adapted to a cross-sectional area of the surrounding exhaust gas channel such that the housing can be arranged tightly in the exhaust gas channel with the sealing flange extending in the circumferential direction around the outer wall of the housing and the sealing flange prevents air flow from flowing past the non-return valve in a gap between the outer wall of the housing and the surrounding exhaust gas channel. The sleeve-shaped housing of the non-return valve advantageously has a circular cross-sectional region, the diameter of which, in conjunction with the circumferential sealing flange, is adapted to the inside diameter of an exhaust gas channel that also has a circular cross-sectional region. However, it is also conceivable that the sleeve-shaped housing of the non-return valve has a shape that deviates from a circular cross-sectional area and, for example, has a rectangular or square cross-sectional area.

A bead-shaped blocking flap seal is expediently arranged along the opening edge, which consists of an elastic deformable material and closes the outflow opening airtight when the blocking flap is pressed against the opening edge of the outflow opening.

An elastic deformable circumferential seal can also be arranged or fixed on the sealing flange running around the outer wall of the housing in the circumferential direction. The circumferential seal can be an O-ring seal, for example, which is embedded in a circumferential groove arranged on the outside of the sealing flange and protrudes slightly in a radial direction.

The sealing flange running around the outer wall of the housing in the circumferential direction can optionally have a circumferential edge projecting radially outwards over a circumferential seal at an outer end opposite the blocking flap. During installation, this circumferential edge can act as a stop for an end region of an exhaust gas channel pipe and thus serve as a depth limit for the non-return valve when the non-return valve is inserted into an exhaust gas channel pipe. In addition, a stop running in the circumferential direction reliably prevents the non-return valve from tilting within a surrounding exhaust gas channel such that unintentional impairment of the functioning of the pivotably mounted blocking flap and thus of the non-return valve during instal- lation and maintenance work during the often very long service life of the non-return valve can be avoided.

In one embodiment it is therefore provided that the blocking flap pivotably mounted on the housing via a hinge, wherein the hinge is arranged offset inwards in the radial direction from an outer circumferential edge of the sealing flange. Due to its dome-shaped bulge, the blocking flap pivoted into the opening position protrudes with the bulging inner region beyond the circumferential edge of the blocking flap. If the hinge were arranged directly adjacent to the outer circumferential edge of the sealing flange in the radial direction, the dome-shaped bulge would limit a pivoting movement of the blocking flap in the direction of the opening position due to a rapid impact of the bulging inner region of the blocking flap on the inner wall of the sur- rounding flow channel and the blocking flap would protrude comparatively far inwards into the flow diameter of the sleeve-shaped housing in the opening position. The radial offset of the hinge from the outer circumferential edge of the sealing flange inwards enables a comparatively wide pivot- ing and opening movement of the blocking flap, which is pivotably mounted on the housing via the hinge, until the bulging inner region of the blocking flap rests against the inner wall of the surrounding flow channel.

In an advantageous manner, it can also be provided that the hinge is arranged on an outer side of the blocking flap such that the opening edge of the outflow opening in the hinge region has an even greater radial offset inwards relative to the outer circumferential edge of the sealing flange than the hinge. This also enables an even greater pivoting movement of the blocking flap into the opening position.

In order to ensure that the blocking flap is mounted in the hinge as reliably as possible, it is optionally provided that the hinge has at least one hinge pin receiving element with a radially outwardly directed hinge pin receiving opening, through which a hinge pin can be inserted and pivotably mounted in the hinge pin receiving element, wherein the hinge pin receiving opening is arranged closer to the outer circumferential edge of the sealing flange in the radial direction than a diameter of the hinge pin. Before arranging the non-return valve in a flow channel surrounding the non-return valve, the blocking flap must be mounted in the hinge on the housing. For this purpose, the hinge pin must be inserted into the at least one hinge pin receiving element through the radially outward-facing hinge pin receiving opening. Since in the assembled state of the non-return valve in the flow channel, the hinge pin receiving opening has a smaller distance from the surrounding inner wall of the flow channel than the diameter of the hinge pin, the hinge pin can no longer be moved out of the hinge pin receiving element after the non-return valve has been assembled in the flow channel. In this way, the operational safety of the non-return valve arranged in the surrounding flow channel can be considerably improved by simple means.

For reliable mounting of the blocking flap in the hinge, it does not matter whether the hinge pin receiving element with the radially outwardly directed hinge pin receiving opening is formed on the housing as described above and the hinge pin is formed on the blocking flap, or whether the hinge pin receiving element is formed on the blocking flap and the hinge pin is formed on the housing. As long as the hinge pin receiving element is formed on the blocking flap, the hinge pin receiving opening expediently points radially inwards. The distance from the hinge pin receiving opening in the radial direction relative to the outer circumferential edge of the sealing flange is also advantageously smaller than the diameter of the hinge pin in this design.

In order to prevent undesired tilting of the blocking flap transverse to a pivoting direction of the blocking flap, the hinge expediently has at least two hinge pin receiving elements spaced along a pivot axis. Either a single and sufficiently long hinge pin can be inserted into the at least two hinge pin receiving elements, or a hinge pin section adapted to each hinge pin receiving element is formed, which can be inserted into the associated hinge pin receiving element.

In particular, with a vertically aligned flow channel and an air flow that is warmer than the inner wall of the flow channel, as is regularly the case with exhaust gas systems and an exhaust gas flow in an exhaust gas channel through which it flows, it cannot be ruled out that a proportion of the moisture carried in the air flow will condense on the inner wall of the surrounding flow channel and run down the inner wall of the flow channel due to gravity. In order to be able to collect the falling condensate at the non-return valve, which prevents the condensate from flowing down beyond the non-return valve due to the sealing flange lying close to the inner wall of the flow channel, a condensate chamber is provided by an indentation in the sleeve-shaped housing in the circumferential direction, in which the falling conden- sate can be collected.

Optionally, it is expediently provided that the indentation is arranged in the hinge region in the circumferential direc- tion and extends in an axial direction from an outer side of the opening edge of the outflow opening in the direction of the inflow opening or extends to the sealing flange. Since a circumferential edge of the blocking flap in the hinge region should be at a distance from the inner wall of the surround- ing flow channel in order to maximise the opening move- ment of the blocking flap, this region is particularly suitable for the formation of an indentation and a condensate cham- ber formed as a result.

According to a particularly advantageous embodiment that the indentation is equipped with a flow opening, through which a condensate accumulating in the condensate chamber delimited by the indentation can flow in the interior of the housing, thereby bypassing the blocking flap, in the vicinity of the opening edge of the outflow opening. Only after a quantity of condensate has accumulated in the condensate chamber and a condensate level in the condensate chamber rises to such an extent that the condensate level rises to the flow opening can the condensate flow out of the condensate chamber through the flow opening into the interior of the housing.

As the indentation extends in an axial direction from the opening edge of the outflow opening in the direction of the inflow opening and, if necessary, extends as far as the sealing flange, a siphon can be formed with the flow opening arranged near the opening edge of the outflow opening. In order to prevent the flow opening from being accessible to a counter-air flow flowing against the outflow direction, one embodiment provides that an airtight flow opening channel in the condensate chamber extends from the flow opening in the direction of the sealing flange and a flow opening channel orifice is arranged at a distance from the flow opening in the condensate chamber. As soon as the condensate level in the condensate chamber rises to above the flow opening channel orifice, the flow opening channel is closed by the condensate collected in the condensate chamber. A counter-air flow approaching the non-return valve against the outflow direction can then no longer flow into the interior of the housing by bypassing the blocking flap and continue to flow in the flow channel against the outflow direction.

A height of a condensate column, which is formed in the flow opening channel when the condensate chamber is completely filled and forms a resistance to the counter-air flow approaching the non-return valve against the outflow direction, can be specified by a distance of the flow opening channel orifice from the flow opening. The greater the distance between the flow opening channel orifice and the flow opening, the greater the flow pressure of the counter-air flow flowing against the outflow direction must be in order to push the condensate collected in the condensate chamber through the flow opening channel and the flow opening until a sufficient amount of condensate has flowed out of the condensate chamber and the flow opening channel orifice is free for the counter-air flow.

According to a particularly advantageous embodiment, it is provided that a bulge of the blocking flap is adapted to an outer circumferential edge of the sealing flange in such a way that in the opening position, the blocking flap can be pivoted as far as possible away from the opening edge in the direction of an inner wall of the surrounding flow channel without projecting radially towards the outer circumferential edge of the housing, which rests against the inner wall of the surrounding flow channel. In conjunction with the course of the opening edge of the outflow opening, which is also bulged in the outflow direction, and the peripheral edge of the blocking flap, which is adapted to this, it is possible to ensure that the blocking flap lies closely against the inner wall of the surrounding flow channel in an opening position pivoted as far away as possible from the opening edge by suitably adapting and specifying the curvature of the blocking flap, wherein in the circumferential direction the course of the inner wall corresponds to the outer circumferential edge of the sealing flange.

It has been shown that a non-rotationally symmetrical blocking flap has particularly advantageous properties. A centre point of the dome-like bulge is expediently formed between a central axis of the sleeve-shaped housing and the hinge region of the opening edge. The bulge itself is expediently predefined in such a way that the blocking flap arranged in the opening position impedes the air flow through the sleeve-shaped housing in the outflow direction as little as possible and forces as few vortices as possible when flowing around the blocking flap in the opening position.

In order to favour the most reliable operation of the non-return valve even when the flow channel becomes increasingly contaminated, it is optionally provided that an outwardly projecting stop limiting element is formed on an outer side of the blocking flap directed away from the housing, which element limits a pivoting movement of the blocking flap into the opening position by means of a stop against an inner wall of the surrounding flow channel. The outwardly projecting stop limiting element can prevent the outside of the blocking flap from resting against the inner wall of the surrounding flow channel over a large area and from adhering to the inner wall of the flow channel in the event of contamination of the inner wall of the surrounding flow channel.

In the following, an exemplary embodiment of the concept of the invention is explained in more detail, which is shown in the drawing. In the drawing:

BRIEF DESCRIPTION OF THE DRAWINGS

FIG. 7 shows a sectional view of the non-return valve, which is arranged in a surrounding flow channel represented schematically.

DETAILED DESCRIPTION

Figure 1:
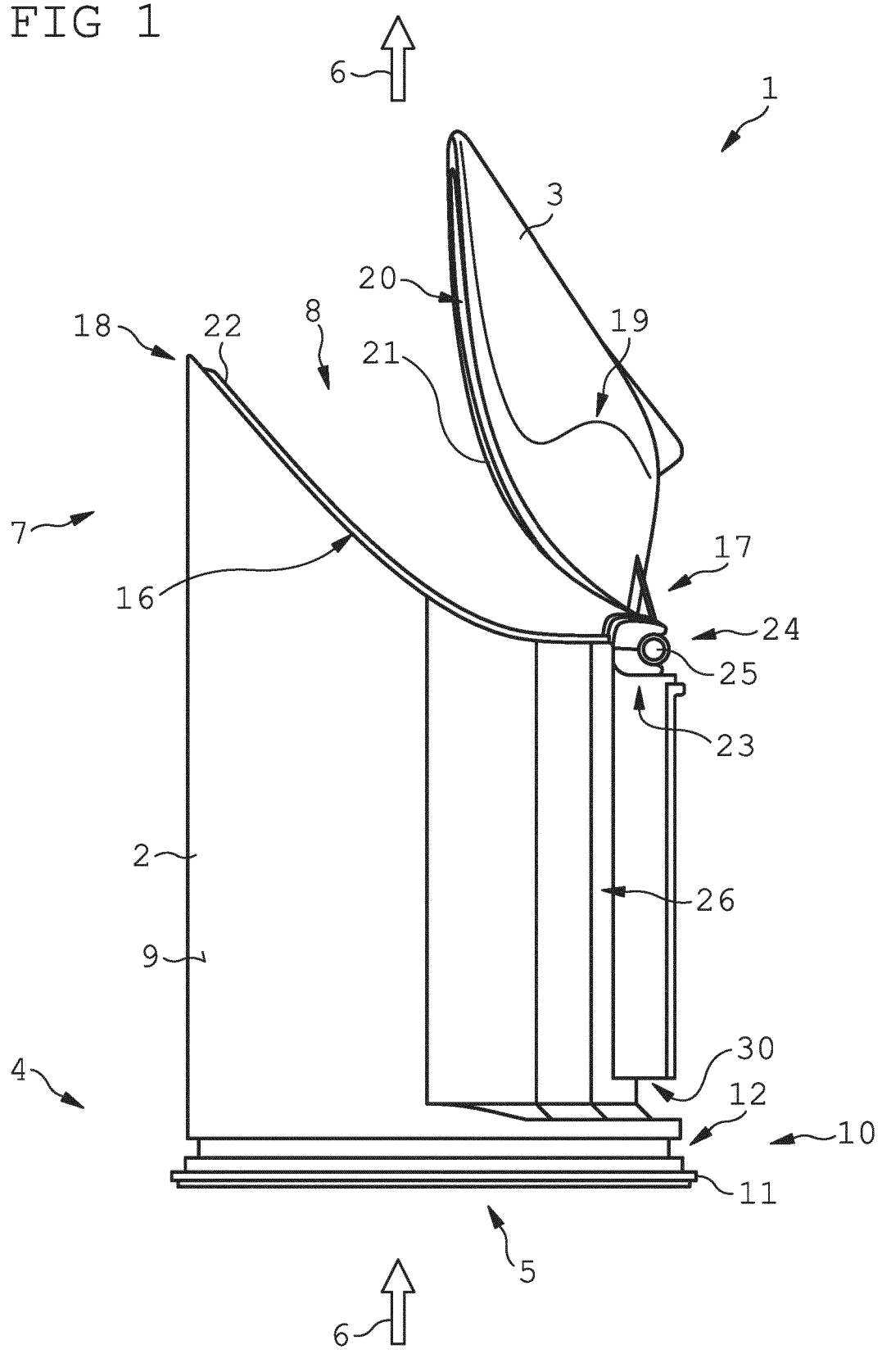
FIG. 1 shows a side view of a non-return valve for a flow channel through which a flow of air flows.
Figure 2:
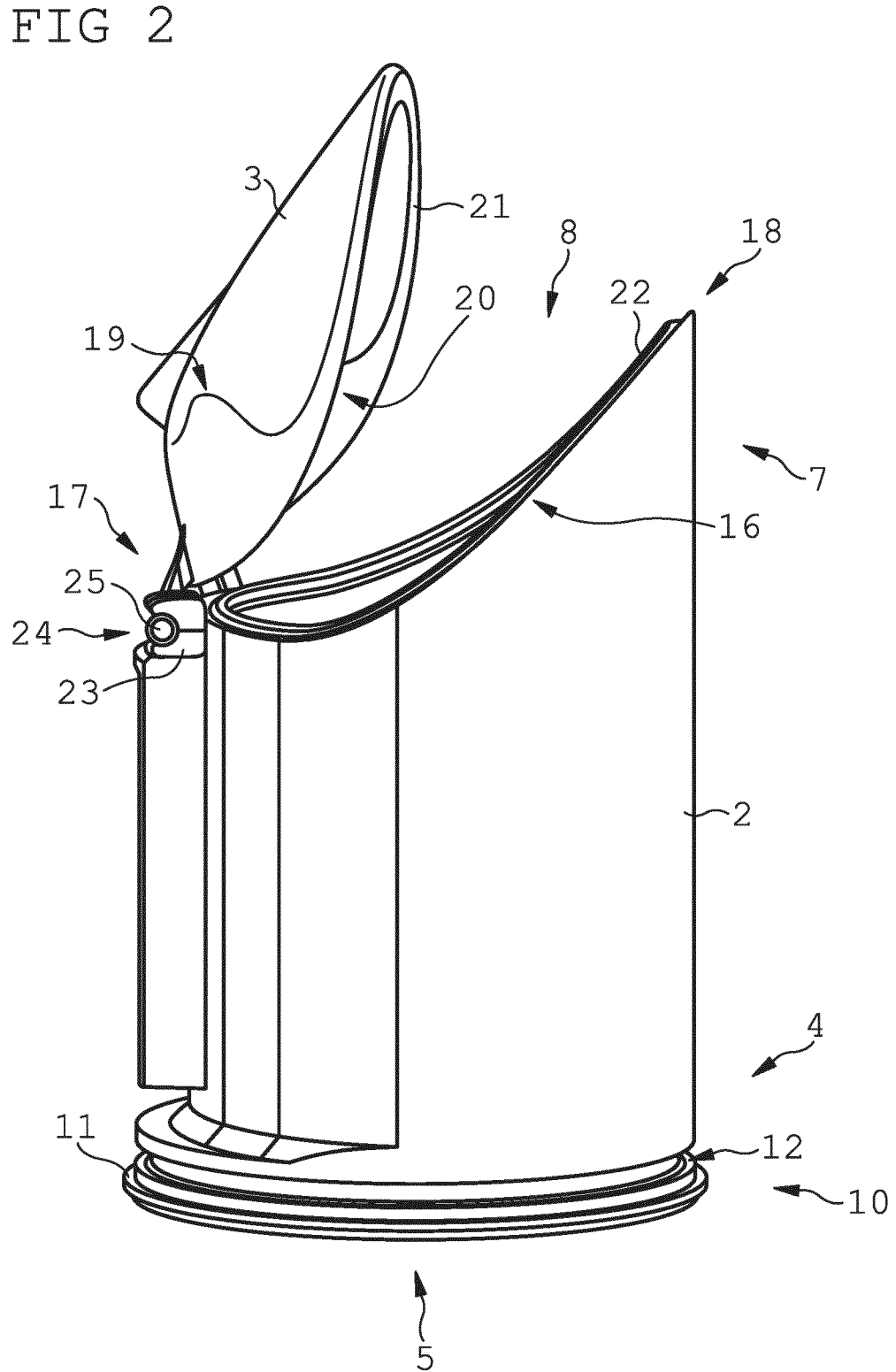
FIG. 2 shows a perspective side view of the non-return valve.
Figure 3:
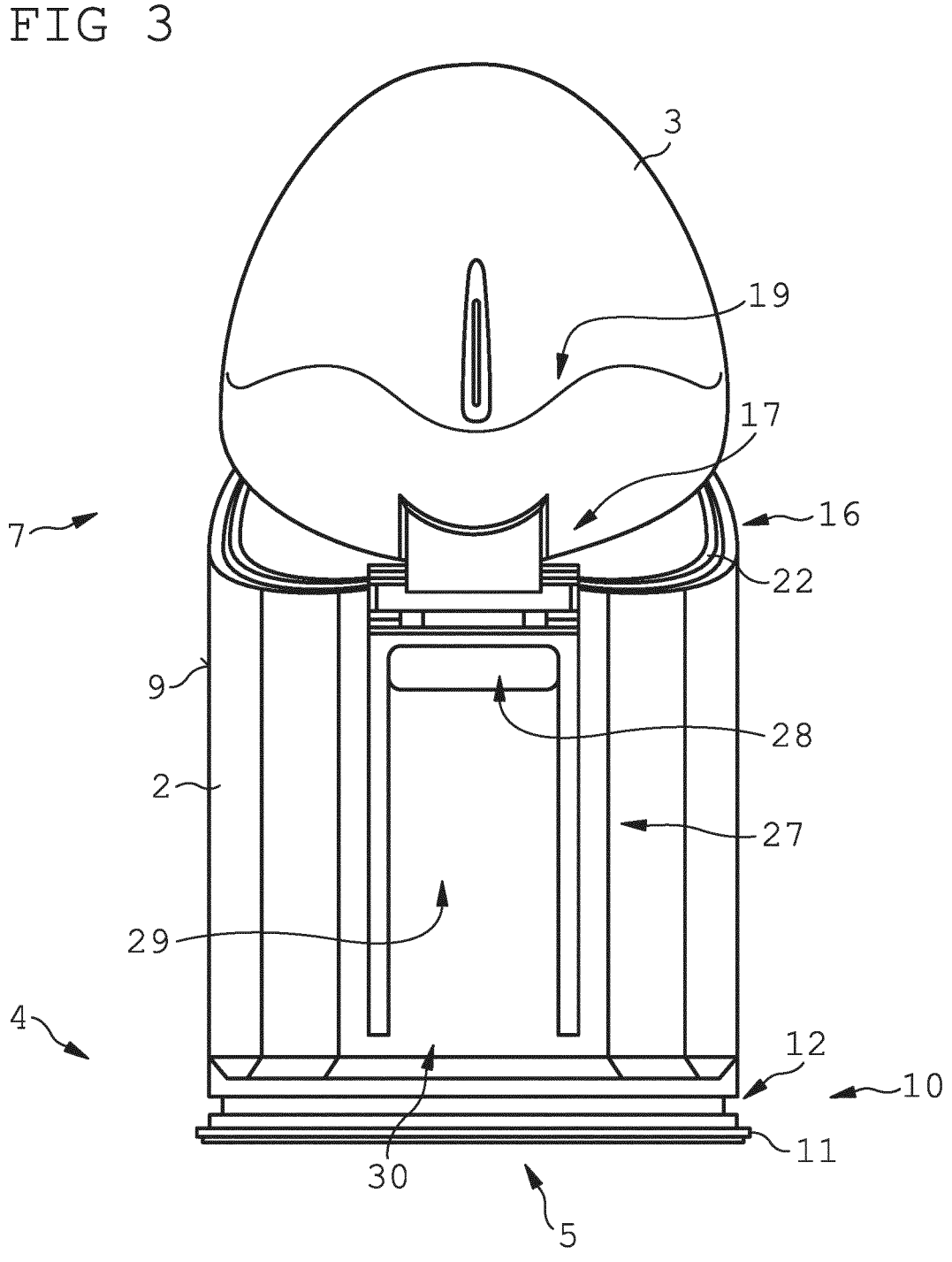
FIG. 3 shows a further side view of the non-return valve shown in FIGS. 1 and 2 from another direction, wherein a hinge region and an indentation with a condensate chamber can be seen.
Figure 4:
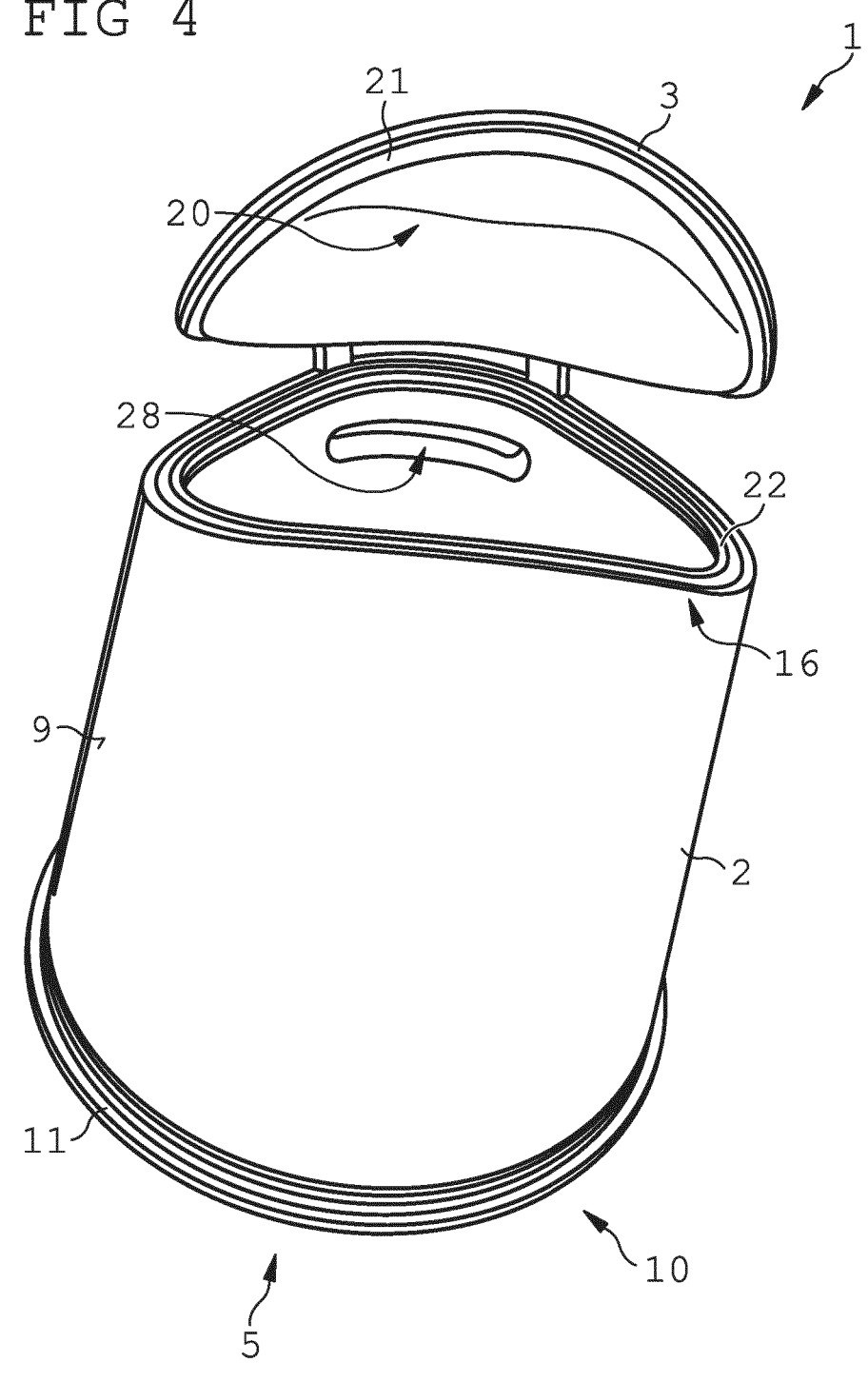
FIG. 4 shows a perspective view of the non-return valve.
Figure 5:
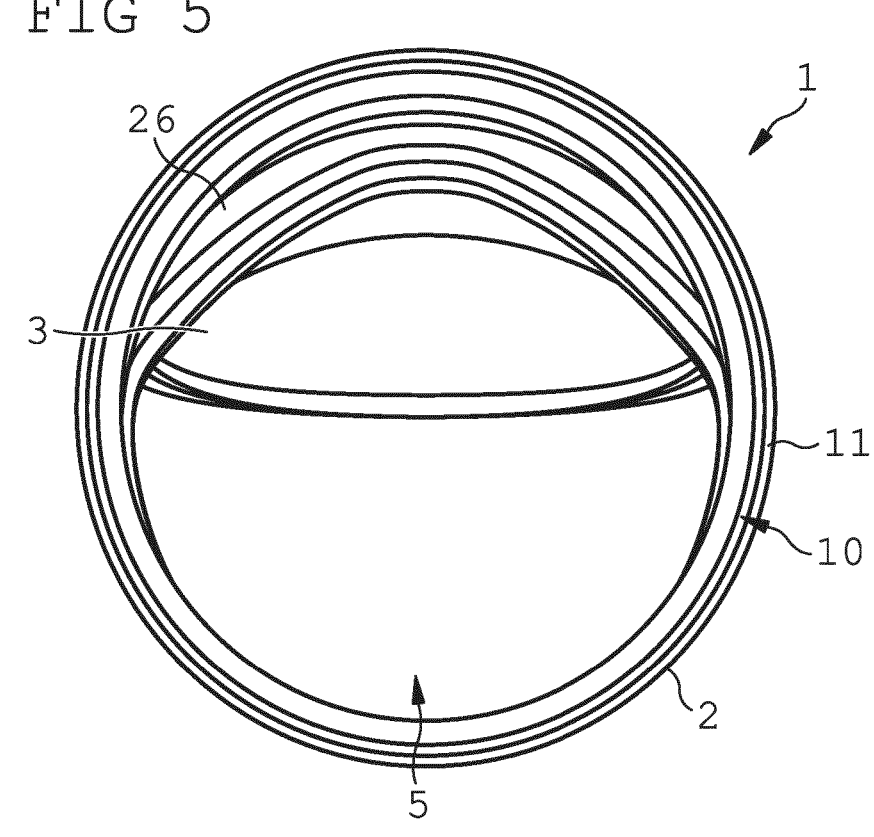
FIG. 5 shows a view through the non-return valve in an outflow direction from an inflow opening facing the viewer through a housing of the non-return valve, wherein a blocking flap located in an opening position projects into an outflow opening facing away from the viewer.
Figure 6:
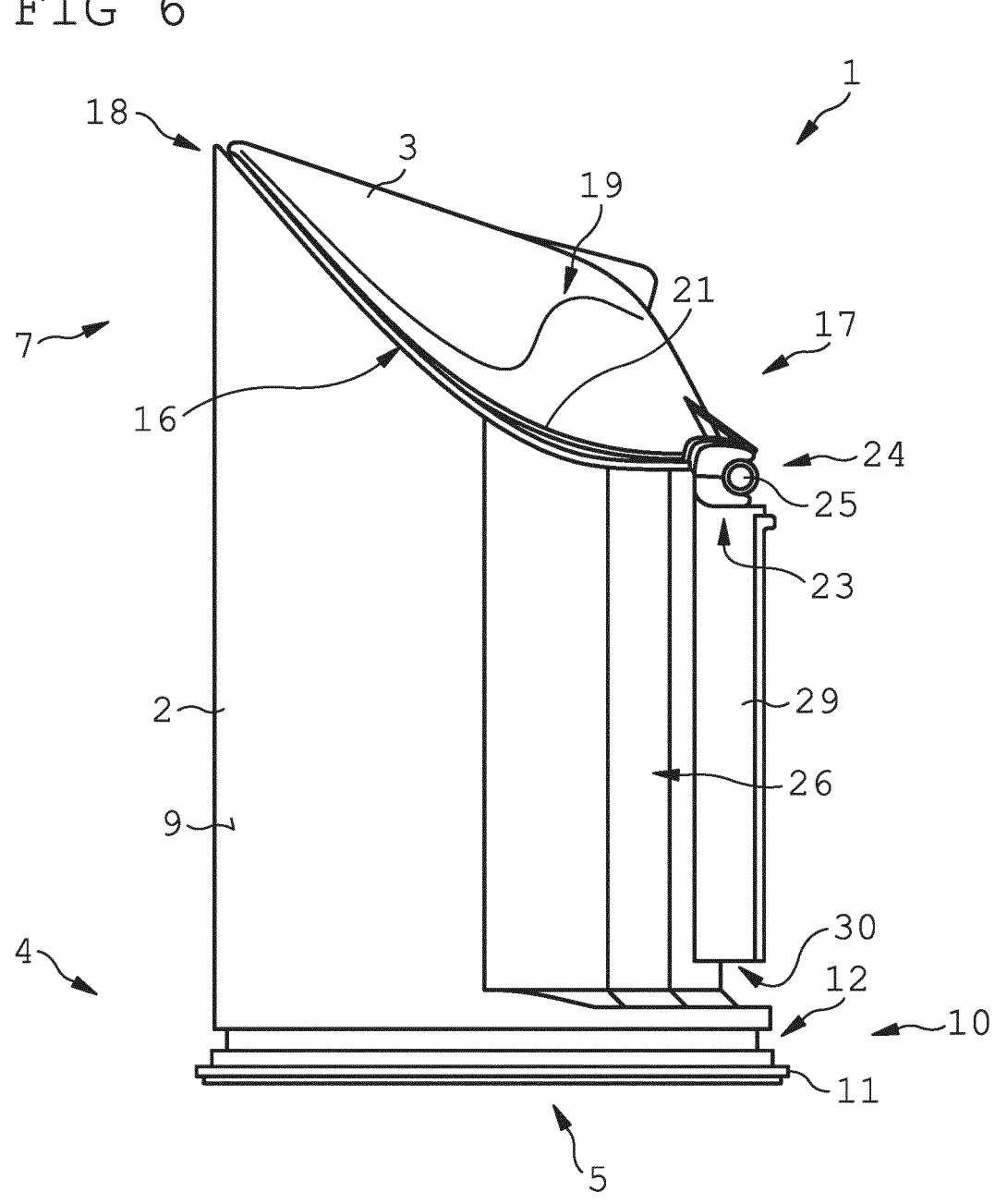
FIG. 6 shows a side view of the non-return valve, wherein the blocking flap is shown in a blocking position blocking the non-return valve.
Figure 8:
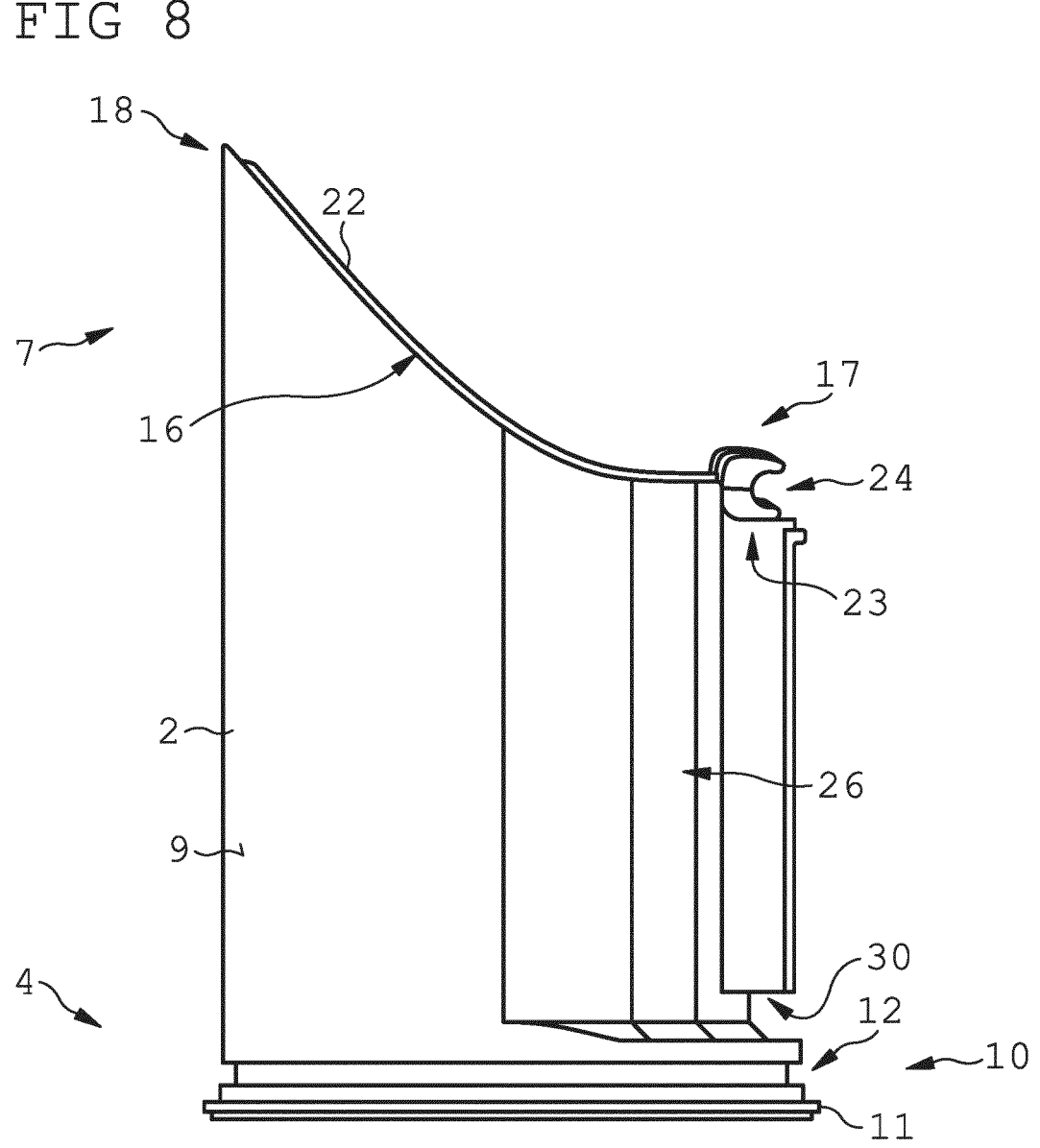
FIG. 8 shows a side view of housing of the non-return valve without the blocking flap mounted pivotably thereon.
Figure 9:
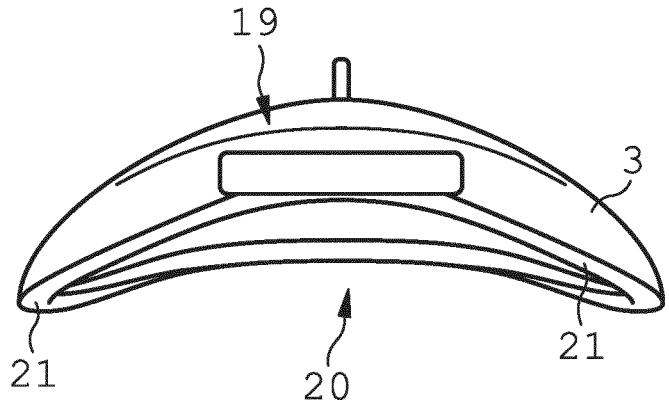
FIG. 9 shows a side view of the blocking flap.
Figure 10:
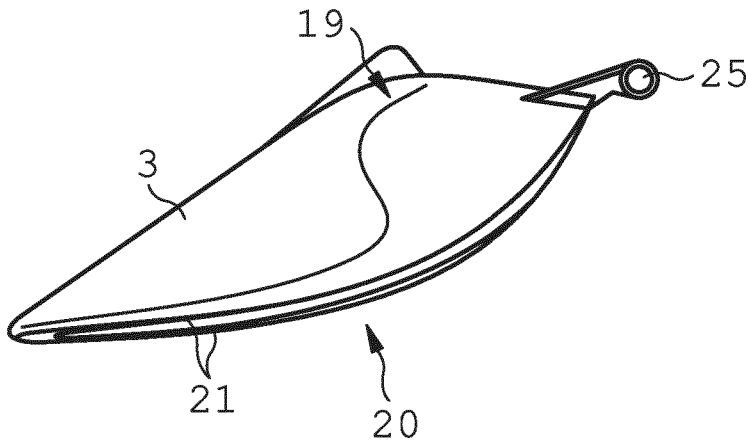
FIG. 10 shows a further side view of the blocking flap from another direction.
Figure 11:
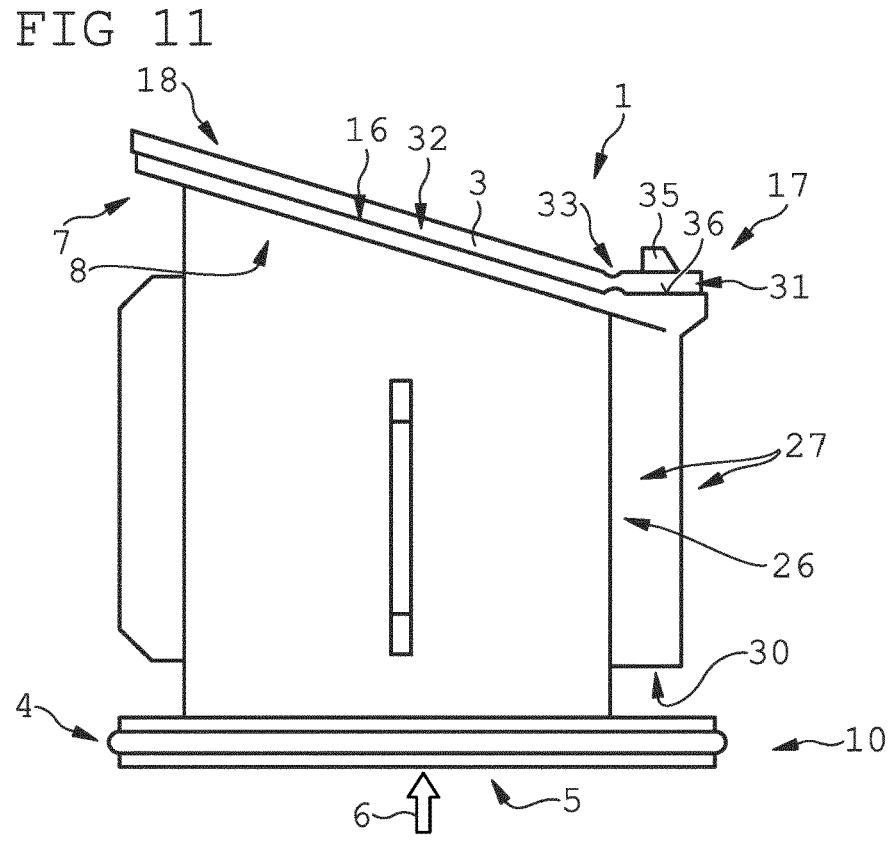
FIG. 11 shows a side view of a different design of a non-return valve with a blocking flap made in one piece from an elastic plastic material.
Figure 12:
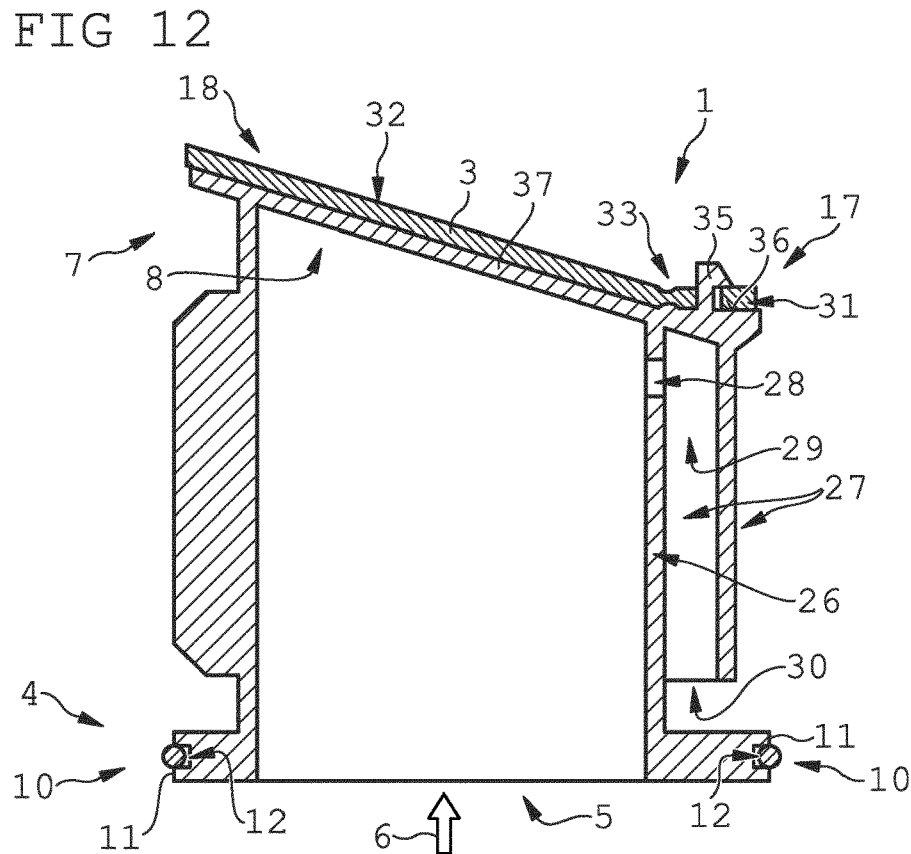
FIG. 12 shows a side view through the non-return valve shown in FIG. 11 along a sectional plane XII-XII in FIG. 11.
Figure 13:
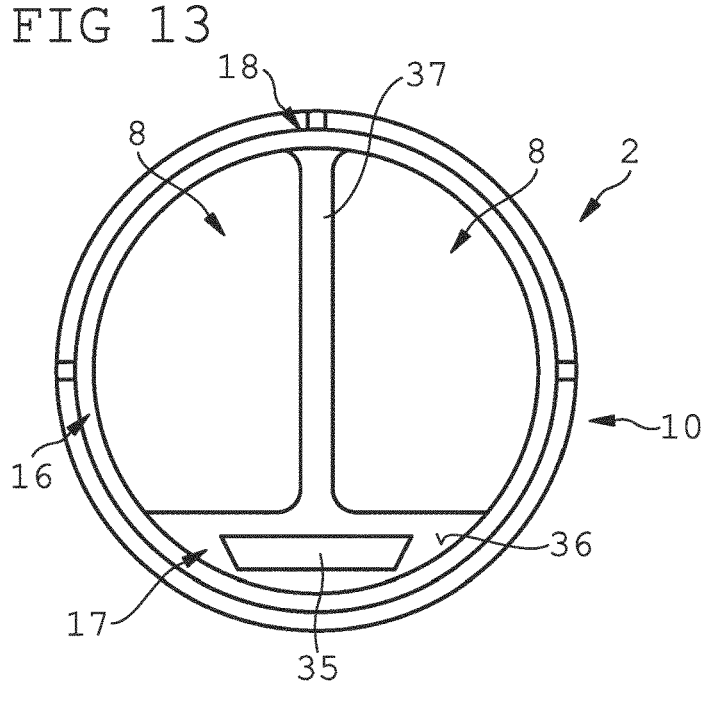
FIG. 13 shows a plan view of the housing of the non-return valve against the outflow direction, wherein the blocking flap is not shown for clarity.

A non-return valve 1 shown in FIGS. 1 to 10 in various different views as well as open or closed has a sleeve-shaped housing 2 and a blocking flap 3 pivotably mounted on the sleeve-shaped housing 2. The housing 2 has an inflow opening 5 at a first end 4 for an air flow passing through the sleeve-shaped housing 2 in an outflow direction. The outflow direction is indicated by two arrows 6 in FIG. 1. At a second end 7 opposite the first end 4, the sleeve-shaped housing 2 has an outflow opening 8. The outflow opening 8 can be opened with the pivotably mounted blocking flap 3, as shown for example in FIGS. 1 to 5 and 7, or closed, as shown in FIG. 6.

Figure 7:
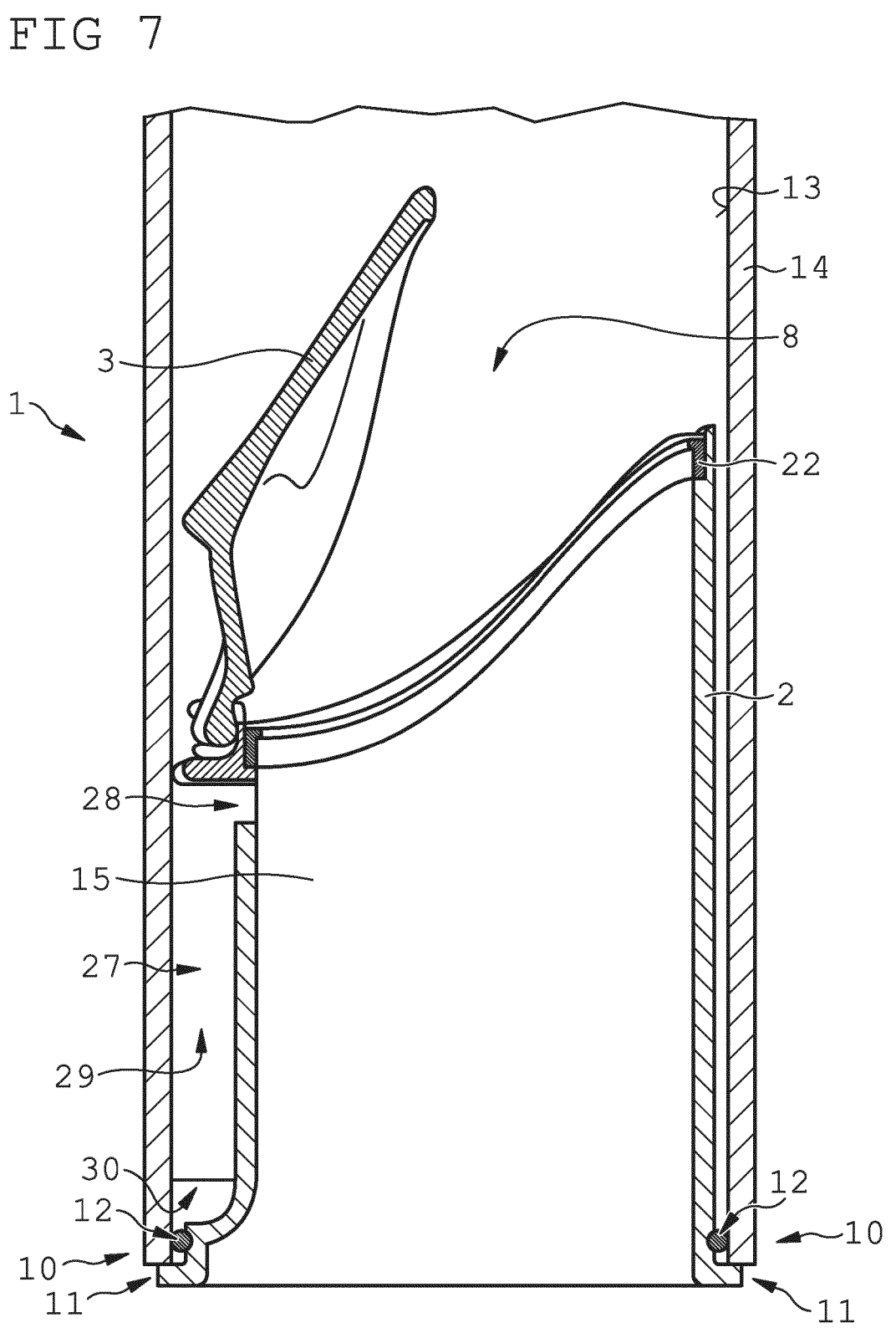

At the first end 4, adjacent to the inflow opening 5, a sealing flange 10 is formed running in the circumferential direction around an outer wall 9 of the housing 2. The sealing flange 10 has an outer circumferential edge 11 projecting radially beyond the outer wall 9 and a directly adjacent sealing groove 12, which also runs around the housing 2 in the circumferential direction, to accommodate an O-ring seal. With the sealing flange 10, the housing 2 of the non-return valve 1 can be arranged and fixed to an inner wall 13 of a surrounding flow channel 14 in such a way that an air flow passing through the flow channel 14 must flow through an interior 15 of the housing 2 and cannot flow laterally between the outer wall 9 of the housing 2 and the inner wall 13 of the surrounding flow channel 14, as shown in FIG. 7. When the non-return valve 1 is installed or when the non-return valve 1 is inserted into a pipe section of the flow channel 14, the radially outwardly projecting circumferential edge 11 forms a stop and sets a depth limit for the inserted non-return valve 1, which facilitates error-free and reliable rapid assembly and also prevents undesired tilting of the non-return valve 1 within the flow channel 14, which would hinder the operation of the pivotably mounted blocking flap 3. The distance measured in the radial direction between the sleeve-shaped housing 2 and the surrounding flow channel 14 is shown comparatively large in FIG. 7 for clarification purposes and can be considerably smaller in practice, or only 0.1 mm or 0.2 mm.

The outflow opening 8 has an opening edge 16 delimiting the outflow opening 8. The opening edge 16 has a hinge region 17 in which the blocking flap 3 is pivotably mounted on the housing 2. Starting from the hinge region 17, the opening edge 16 merges into a blocking flap stop region 18 arranged opposite in the circumferential direction. The blocking flap stop region 18 is offset in the outflow direction relative to the hinge region 17, wherein the opening edge 16 in the blocking flap stop region 18 is at a greater distance from the inflow opening 5 and the sealing flange 10 than the opposite hinge region 17. Therefore, the opening edge 16 has a curved course not only in the circumferential direction, but also in the outflow direction. This curved shape of the opening edge 16 can be clearly seen in FIG. 1, for example.

The blocking flap 3 has a dome-shaped bulge 19 with an inner region 20 that is curved forwards in the outflow direction. A circumferential edge 21 of the blocking flap 3 is adapted to the course of the opening edge 16 of the outflow opening 8 such that the blocking flap 3 tightly closes the outflow opening 8 of the sleeve-shaped housing 2 in a blocking position adjacent to the opening edge 16, as shown as an example in FIG. 6. In order to increase the sealing effect of the non-return valve 1 in a blocked blocking position of the blocking flap 3, a blocking flap seal 22 made of an elastic sealing material is arranged along the opening edge 16.

The shape of the blocking flap 3 and, in particular, the dome-shaped bulge 19 and the circumferential edge 21, which, like the opening edge 16, is curved both in the circumferential direction and in the outflow direction, is predetermined in such a way that the blocking flap 3 can be pivoted as far away as possible from the opening edge 16 into an opening position within the surrounding flow channel 14, in which it obstructs an air flow flowing through the housing 2 in the outflow direction as little as possible and restricts a cross-sectional flow area available for the air flow passing through, such as that available in the interior 15 of the housing 2 in FIG. 5, as little as possible. The shape of the blocking flap 3 is also adapted and predetermined such that when air flows around the blocking flap 3, it can flow past the blocking flap 3 in the opening position with as little turbulence as possible due to the air flow passing through the non-return valve 1 in the outflow direction.

In the hinge region 17, the housing 2 has two hinge pin receiving elements 23 arranged at a distance from each other. Each hinge pin receiving element 23 has a radially outwardly orientated hinge pin receiving opening 24. Two hinge pin sections 25 are formed on the blocking flap 3, with which the blocking flap 3 can be inserted through the hinge pin receiving opening 24 into the hinge pin receiving element 23. The hinge pin sections 25 are received and retained in the hinge pin receiving elements 23 in a latching manner. In addition, the blocking flap 3 is pivotably mounted in the hinge pin receiving elements 23 via the hinge pin sections 25. A distance between the hinge pin receiving openings 24 of the hinge pin receiving elements 23 and the inner wall 13 of the surrounding flow channel 14 is less than a diameter of the hinge pin sections 25 such that the blocking flap 3 can no longer completely disengage from the hinge pin receiving elements 23 in a state of the non-return valve 1 mounted in the flow channel 14. This increases the operational safety of the non-return valve 1.

The sleeve-shaped housing 2 has an indentation 26 in the circumferential direction in the region of the hinge region 17, which is arranged next to the outflow opening 8 and is not closed by the blocking flap 3 in its blocked position. With the housing 2 inserted into the surrounding flow channel 14, the indentation 26 forms a condensate chamber 27, which is accessible from a direction opposite to the outflow direction. The indentation 26 extends in an axial direction from an outer side of the opening edge 16, or from the outflow opening 8 in the direction of the inflow opening 5, to the immediate vicinity of the sealing flange 10. Liquid condensate can accumulate in the condensate chamber 27 and run down the inner wall 13 of the surrounding flow channel 14 in the direction of the non-return valve 1 against the direction of outflow, as is often the case with a non-return valve 1 arranged in a vertical exhaust gas channel as part of an exhaust gas system.

A flow opening 28 is formed in the indentation 26 near the opening edge 16 of the outflow opening 8, through which the condensate, which accumulates in the condensate chamber 27 bounded by the indentation 26, can flow into the interior 15 of the housing 2 and then out of the housing 2, bypassing the blocking flap 3. In order to prevent the flow opening 28 from also being accessible to a counter-air flow approaching the blocked non-return valve 1 in the opposite direction to the outflow direction and to allow an undesirable environment for the closed blocking flap 3, an airtight flow opening channel 29 is formed in the condensate chamber 27, which extends in the axial direction from the flow opening 28 surrounded by the flow opening channel 29 in the direction of the sealing flange 10 and opens into a flow opening channel orifice 30 in the immediate vicinity of the sealing flange 10. As soon as a small amount of condensate accumulates in the condensate chamber 27, a condensate level rises in an axial direction from the sealing flange 10 to above the flow opening channel orifice 30 and thus closes the flow opening channel. With an increasing accumulation of condensate in the condensate chamber 27, the condensate level in the condensate chamber 27 and in the flow opening channel 29 rises until the condensate level reaches the flow opening 28 and the condensate accumulating in the condensate chamber 27 can flow out through the flow opening 28 into the interior 15 of the housing 2. The flow opening channel 29 therefore forms a siphon and blocks the flow opening 28 for a counter-air flow approaching the non-return valve 1 against the return flow direction.

FIGS. 11 to 15 show a deviating embodiment of a non-return valve 1 as an example and schematically. Only features of this non-return valve 1 that differ from the variant shown in FIGS. 1 to 10 are described below.

The housing 2 has an opening edge 16 of the outflow opening 8, which runs in a plane that is inclined at an angle of approximately 80 degrees to the outflow direction 6. When the non-return valve 1 is arranged in a vertical line section, the plane in which the opening edge 16 runs is inclined by about 10 degrees relative to a horizontal plane.

Figure 14:
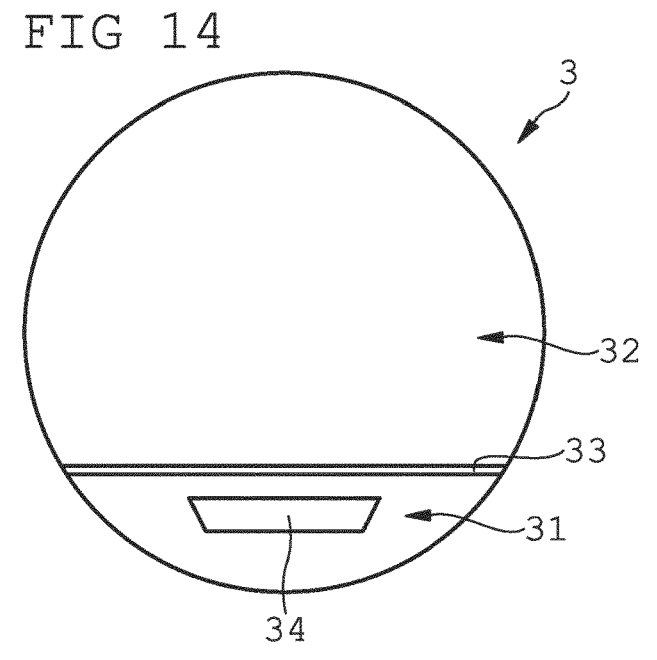
FIG. 14 shows a plan view of the blocking flap of the non-return valve shown in FIGS. 11 and 12.
Figure 15:
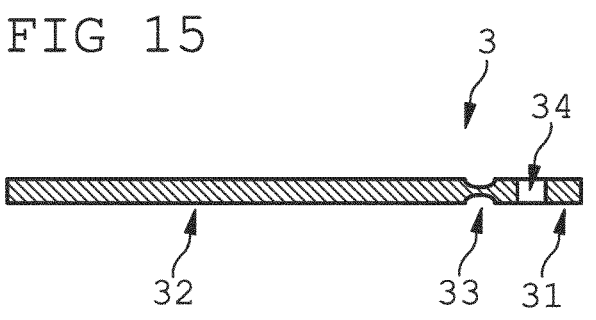
FIG. 15 shows a sectional view through the blocking flap shown in FIG. 14.

The blocking flap 3 is made in one piece from an elastic plastic material such as a suitable fluoroelastomer. FIGS. 14 and 15 show the blocking flap 3 in the sole position without the housing of the non-return flap 1. The blocking flap 3 has a fixing section 31 and a pivoting flap section 32. The pivoting flap section 32 is connected to the fixing section 31 via an integral hinge 33. A recess 34 is formed in the fixing section 31 in order to fix the fixing section 31 with a clamping lug 35 projecting through this recess 34 to the hinge region 17 on the opening edge 16. The hinge region 17 has a flat contact surface 36, which is aligned at an angle to the plane in which the opening edge 16 extends.

By fixing the fixing section 31 of the blocking flap 3 on the contact surface 36 of the hinge region 17, the pivoting flap section 32 of the pivoting flap 3 resting against the opening edge 16 is elastically deformed. The resulting restoring force presses the pivoting flap section 32 against the opening edge 16 and closes the outflow opening 8.

The housing 2 also has a support web 37 extending across the outflow opening 8 and between opposing edge regions of the opening edge 16. The blocking flap 3 rests on the support web 37 in a strip region running approximately in the centre with a pivoting flap section 32 resting against the opening edge 16. The support web 37 prevents undesired deformation of the elastically deformable pivoting flap section 32 in the event of a counterflow directed against the outflow direction 6 into the housing 2 and ensures or supports reliable closure of the outflow opening 8.

The invention claimed is:

1. A non-return valve (1) for a hollow cylindrical flow channel (14) for air, comprising
a housing (2), through which air can flow in an outflow direction, having an outflow opening (8) that can be closed by a blocking flap (3) pivotably mounted on the housing (2),
wherein the housing (2) is sleeve-shaped and comprises an inflow opening (5) opposite the outflow opening (8),
wherein the housing (2) can be arranged in the hollow cylindrical flow channel (14) with a sealing flange (10) extending in a circumferential direction around an outer wall (9) of the housing (2) such that air flowing through the flow channel (14) flows into the housing (2) in the outflow direction (6) through the inflow opening (5) and out of the housing (2) through the outflow opening (8),
wherein the blocking flap (3) rests against an opening edge (16) in a blocking position, thereby closing the outflow opening (8) and preventing undesired return flow against the outflow direction (6) into the outflow opening (8),

wherein the blocking flap (3) is pivoted away from the opening edge (16) in an opening position and releases the outflow opening (8) while air is flowing through the housing (2) in the outflow direction (6),
wherein the opening edge (16) of the outflow opening (8) comprises a hinge region (17),
wherein the blocking flap (3) is pivotably mounted on the housing (2) in the hinge region (17),
wherein the opening edge (16) transitions into a blocking flap stop region (18) arranged opposite the hinge region in the circumferential direction,
wherein the blocking flap stop region (18) is offset in the outflow direction (6) from the hinge region (17), and
wherein the housing (2) comprises an indentation (26) in form of a longitudinal recess not closed by the blocking flap (3),
wherein the indentation (26) forms a condensate chamber (27) between the housing (2) and the hollow cylindrical flow channel (14) when the housing (2) is inserted into the hollow cylindrical flow channel (14).

2. The non-return valve (1) according to claim 1, wherein the blocking flap (3) is made from an elastic plastic material and is configured and mounted on the housing (2) in such a way that the outflow opening (8) is closed by the elastically pretensioned blocking flap (3) without air flowing through it.

3. The non-return valve (1) according to claim 2, wherein the blocking flap (3) comprises
a fixing section (31) for fixing the blocking flap on or to the hinge region (17) of the opening edge (16) and
a pivoting flap section (32), the pivoting flap section (32) being connected to the fixing section (31) via an integral hinge (33).

4. The non-return valve (1) according to claim 2, wherein a support web (37) is arranged in front of the blocking flap (3) in the outflow direction (6),
wherein the blocking flap (3) rests on the support web (37) in the blocking position, and
wherein the support web (37) extends transversely over the outflow opening (8) and thereby prevents undesired pivoting or deformation of the elastic blocking flap (3) against the outflow direction (6) when the return flow is directed against the outflow opening (8).

5. The non-return valve (1) according to claim 1, wherein the blocking flap (3) has a dome-shaped bulge (19) with an inner region (20) that is curved forwards in the outflow direction (6).

6. The non-return valve (1) according to claim 1, wherein the opening edge (16) has a curved course in the circumferential direction and in the outflow direction (6).

7. The non-return valve (1) according to claim 1, wherein the blocking flap (3) is pivotably mounted on the housing (2) via a hinge, and
wherein the hinge is arranged offset inwards in a radial direction from an outer circumferential edge (11) of the sealing flange (10).

8. The non-return valve (1) according to claim 7, wherein the hinge comprises at least one hinge pin receiving element (23) with a radially outwardly directed hinge pin receiving opening (24),
wherein a hinge pin (25) can be inserted through the hinge pin receiving opening (24) and pivotably mounted in the hinge pin receiving element (23), and wherein the hinge pin receiving opening (24) is arranged closer to the outer circumferential edge (11) of the sealing flange (10) in the radial direction than a diameter of the hinge pin (25).

9. The non-return valve (1) according to claim 1, wherein the condensate chamber (27) is accessible from a direction opposite to the outflow direction (6), and wherein the condensate chamber (27) is sealed by the sealing flange (10).

10. The non-return valve (1) according to claim 9, wherein the indentation (26) is arranged in the hinge region (17) in the circumferential direction and extends in an axial direction from an outer side of the opening edge (16) of the outflow opening (8) in the direction of the inflow opening (5).

11. The non-return valve (1) according to claim 9, wherein a flow opening (28) is arranged in the indentation (26) in a vicinity of the opening edge (16) of the outflow opening (8) at the hinge region (17), through which opening (28) a condensate accumulating in the condensate chamber (27) delimited by the indentation (26) can flow into an interior of the housing (2) bypassing the blocking flap (3).

12. The non-return valve (1) according to claim 11, wherein an airtight flow opening channel (29) in the condensate chamber (27) extends from the flow opening (28) in the direction of the sealing flange (10) and a flow opening channel orifice (30) is arranged at a distance from the flow opening (28) in the condensate chamber (27).

13. The non-return valve (1) according to claim 1, wherein a bulge (19) of the blocking flap (3) is adapted to an outer circumferential edge (11) of the sealing flange (10) in such a way that the blocking flap (3) can be pivoted as far as possible away from the opening edge (16) in the opening position without projecting radially towards the outer circumferential edge (11).

14. The non-return valve (1) according to claim 1, wherein an outwardly projecting stop limiting element is formed on an outer side of the blocking flap (3) directed away from the housing (2), and wherein the stop limiting element limits a pivoting movement of the blocking flap (3) into the opening position by a stop against an inner wall (13) of the hollow cylindrical flow channel (14).

15. The non-return valve (1) according to claim 1, wherein the non-return valve (1) is configured to be installed in a vertical orientation.

* * * * *